(12) United States Patent
De Ponnat et al.

(10) Patent No.: US 11,891,916 B2
(45) Date of Patent: Feb. 6, 2024

(54) METHOD FOR PRODUCING METAL ALLOY PARTS WITH COMPLEX SHAPE

(71) Applicant: Mecachrome France, Amboise (FR)

(72) Inventors: Arnaud De Ponnat, Vouvray (FR); Olivier Martin, Sainte Genevieve des Bois (FR)

(73) Assignee: Mecachrome France, Amboise (FR)

( * ) Notice: Subject to any disclaimer, the term of this patent is extended or adjusted under 35 U.S.C. 154(b) by 665 days.

(21) Appl. No.: 16/493,108

(22) PCT Filed: Mar. 12, 2018

(86) PCT No.: PCT/FR2018/000051
§ 371 (c)(1),
(2) Date: Sep. 11, 2019

(87) PCT Pub. No.: WO2018/167384
PCT Pub. Date: Sep. 20, 2018

(65) Prior Publication Data
US 2020/0116029 A1    Apr. 16, 2020

(30) Foreign Application Priority Data

Mar. 13, 2017  (FR) ...................................... 1752018

(51) Int. Cl.
*B23K 20/02* (2006.01)
*B23P 15/04* (2006.01)
(Continued)

(52) U.S. Cl.
CPC ............ *F01D 5/147* (2013.01); *B23K 20/001* (2013.01); *B23K 20/02* (2013.01); *B23K 20/129* (2013.01); *B23P 15/04* (2013.01); *F01D 5/3061* (2013.01); *B23K 2101/001* (2018.08); *B23K 2103/14* (2018.08); *B23K 2103/52* (2018.08);
(Continued)

(58) Field of Classification Search
None
See application file for complete search history.

(56) References Cited

U.S. PATENT DOCUMENTS 3,524,712 A    8/1970 Petrie et al.
5,797,725 A *  8/1998 Rhodes ................... B23P 6/005
                                                    415/209.2
(Continued)

FOREIGN PATENT DOCUMENTS

EP    1481755 A1    12/2004
EP    1905956 A2     4/2008
(Continued)

OTHER PUBLICATIONS

May 23, 2018, International Search Report of Application No. PCT/FR2018/000051.

*Primary Examiner* — Devang R Patel
(74) *Attorney, Agent, or Firm* — Banner & Witcoff, Ltd.

(57) ABSTRACT

The present invention relates to a method for obtaining a solid blade of a turbomachine, comprising a core, a tip and a root, the method comprising: —a step of producing a blank from at least two parts (50, 51), at least one of which is a solid part, the at least two parts being assembled by a diffusions connection technique and without melting, and—a step of machining this blank in order to produce a blade with a defined profile.

12 Claims, 10 Drawing Sheets

(51) Int. Cl.
  *F01D 5/14* (2006.01)
  *B23K 20/12* (2006.01)
  *F01D 5/30* (2006.01)
  *B23K 20/00* (2006.01)
  *B23K 101/00* (2006.01)
  *B23K 103/00* (2006.01)
  *B23K 103/14* (2006.01)

(52) U.S. Cl.
  CPC .... *F05D 2220/30* (2013.01); *F05D 2230/239* (2013.01); *F05D 2300/6033* (2013.01)

(56) References Cited

U.S. PATENT DOCUMENTS

| | | | |
|---|---|---|---|
| 6,291,086 B1* | 9/2001 | Nguyen-Dinh | F01D 5/025 228/262.44 |
| 6,705,011 B1* | 3/2004 | Leibfried | B23P 15/04 29/889.7 |
| 7,686,571 B1 | 3/2010 | Matheny | |
| 8,685,314 B2* | 4/2014 | Tuppen | B23K 20/10 419/62 |
| 2011/0217176 A1* | 9/2011 | Uihlein | B23K 15/0093 29/889.21 |
| 2011/0268584 A1* | 11/2011 | Mittendorf | F01D 5/288 416/97 R |
| 2014/0130353 A1* | 5/2014 | Kington | B23P 15/006 29/889.7 |
| 2015/0016972 A1 | 1/2015 | Freeman et al. | |
| 2015/0231746 A1* | 8/2015 | Marcillaud | F01D 5/147 29/889.7 |
| 2016/0146024 A1* | 5/2016 | Morris | F01D 5/187 228/104 |
| 2016/0273368 A1* | 9/2016 | Smarsly | C22C 1/0491 |
| 2017/0246707 A1* | 8/2017 | Bray | B23K 20/1225 |

FOREIGN PATENT DOCUMENTS

| | | |
|---|---|---|
| EP | 2423340 A1 | 2/2012 |
| EP | 2772614 A1 | 9/2014 |
| EP | 3103580 A1 | 12/2016 |
| FR | 2981590 A1 | 4/2013 |
| FR | 2993804 A1 | 1/2014 |
| FR | 2997885 A1 | 5/2014 |
| WO | 2012/052359 A1 | 4/2012 |
| WO | 2014057208 A2 | 4/2014 |

* cited by examiner

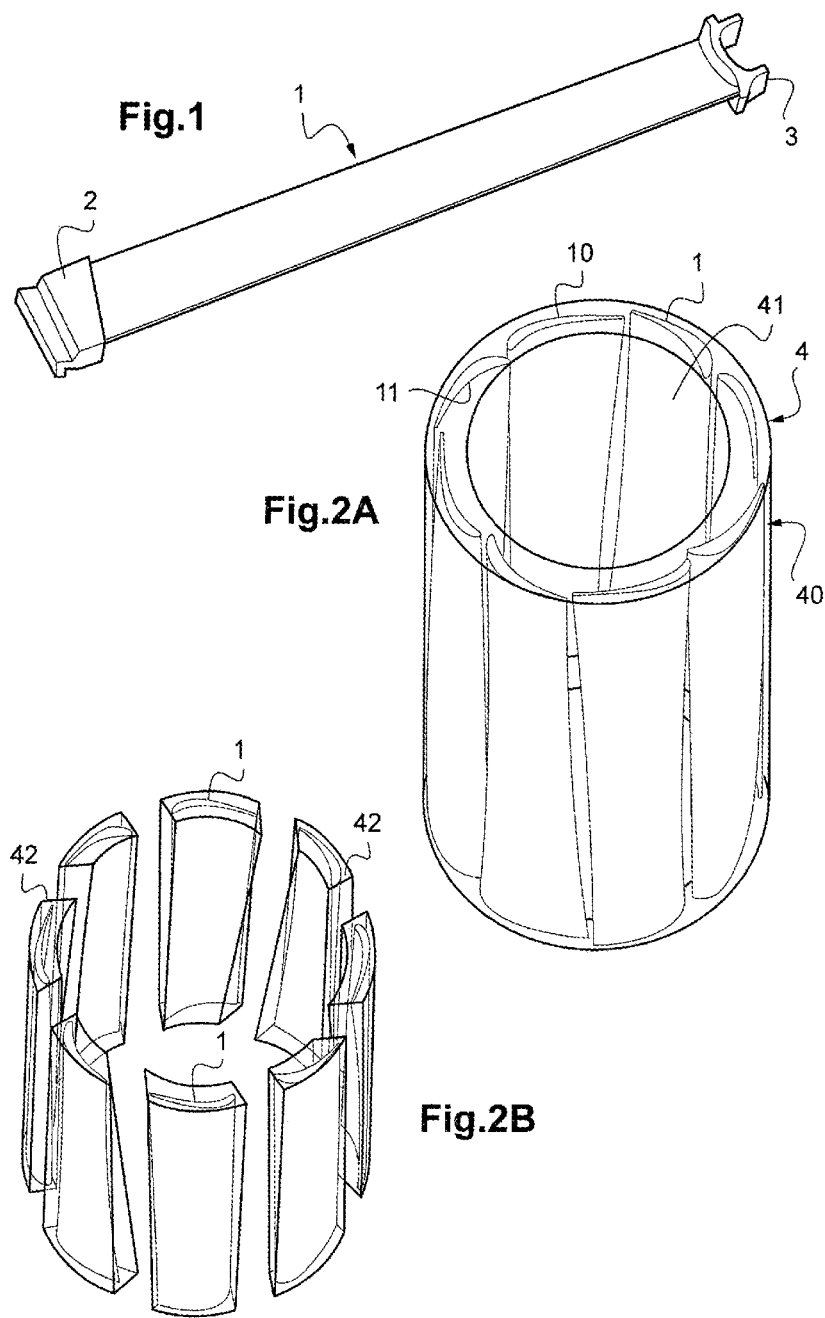

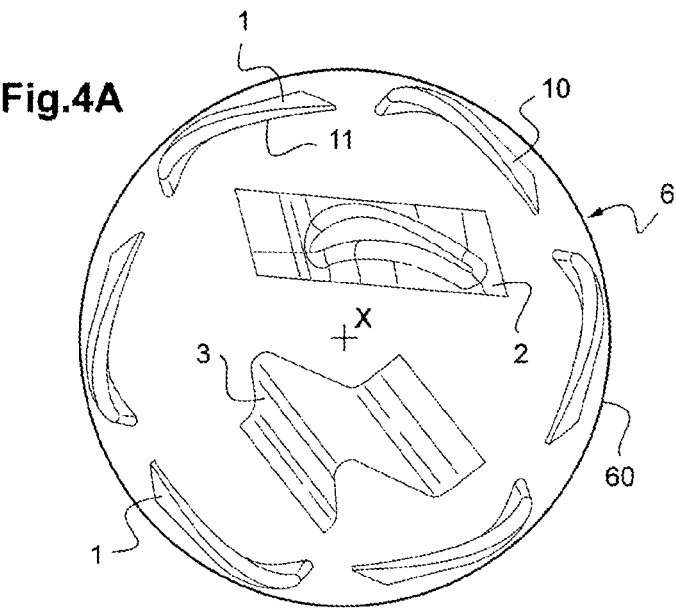
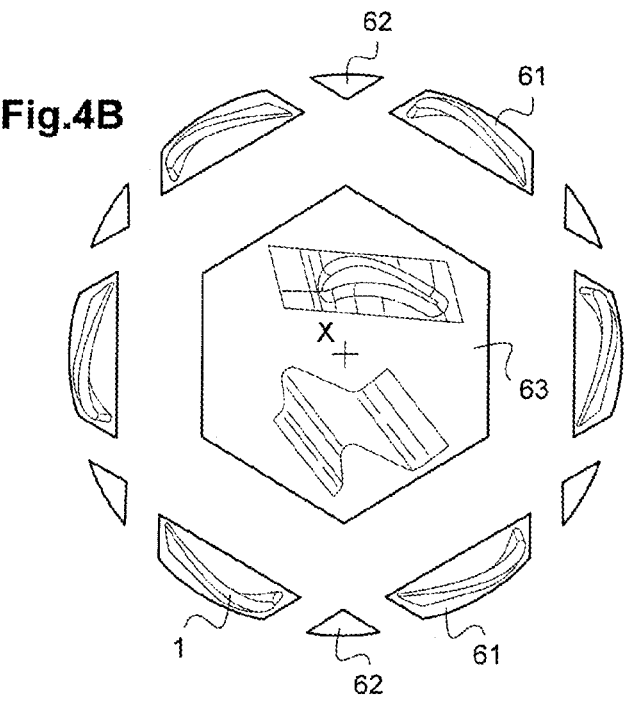

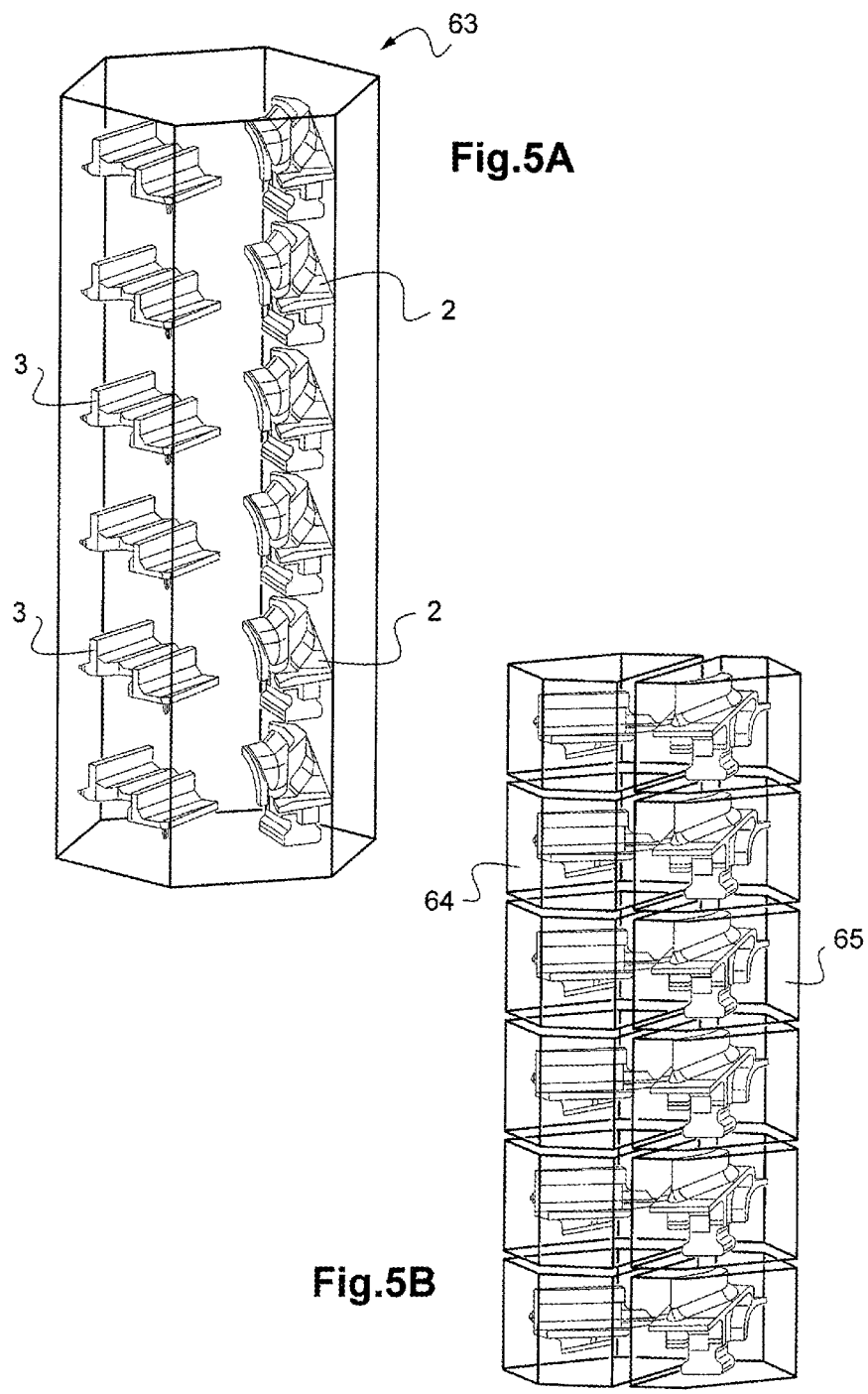

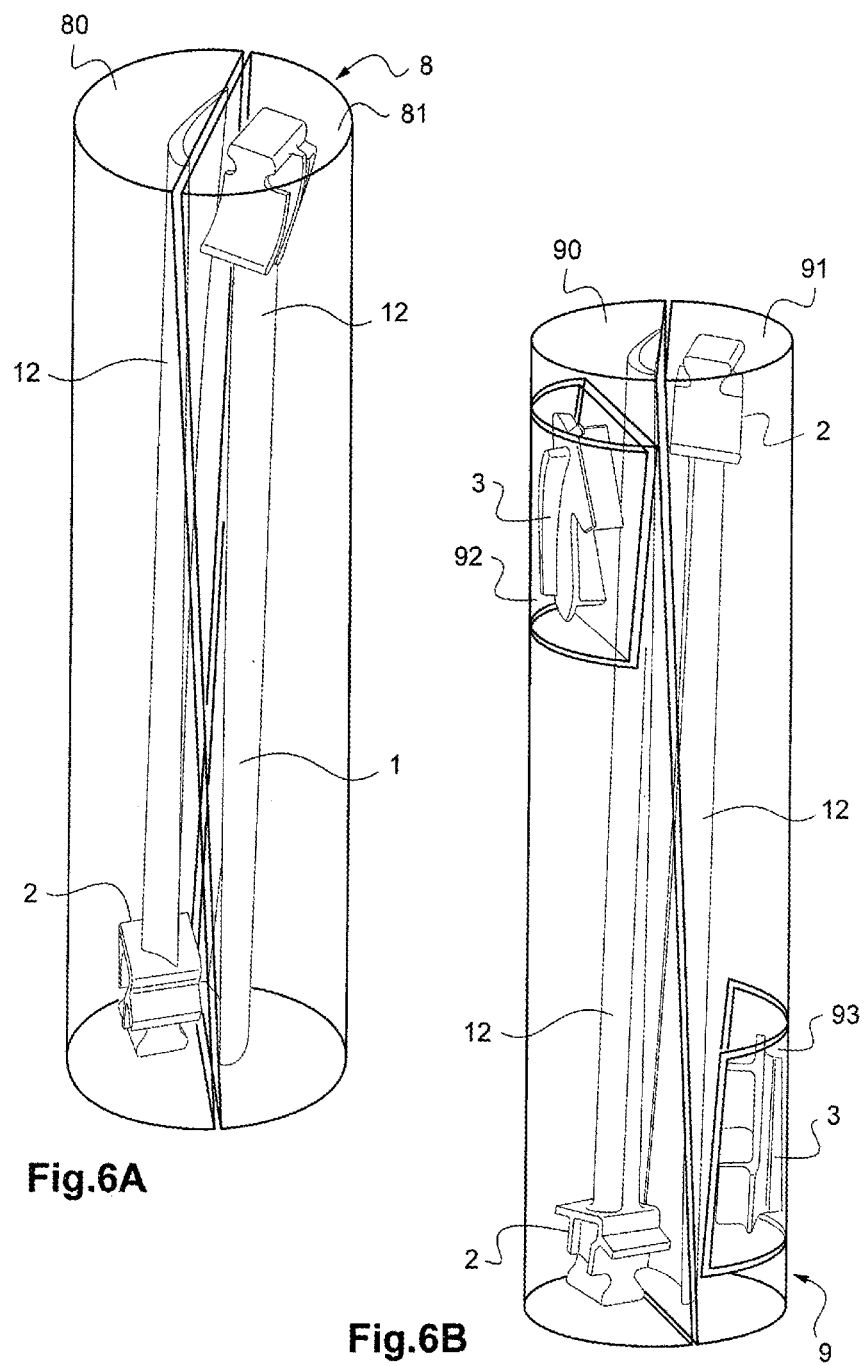

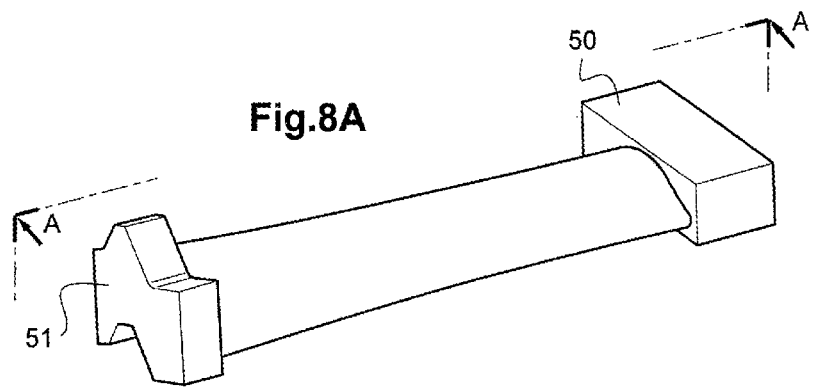
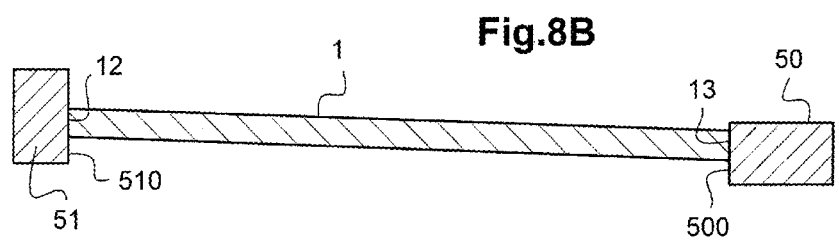
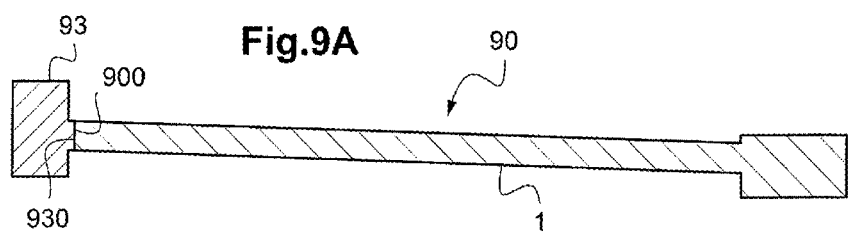
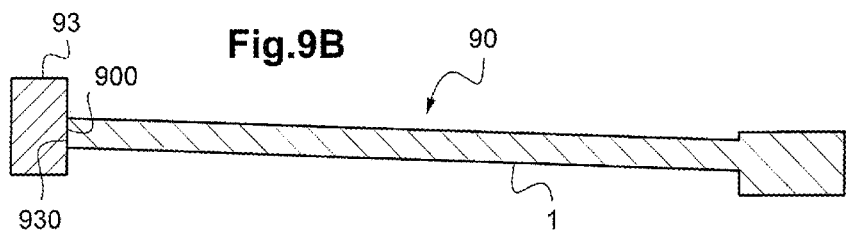

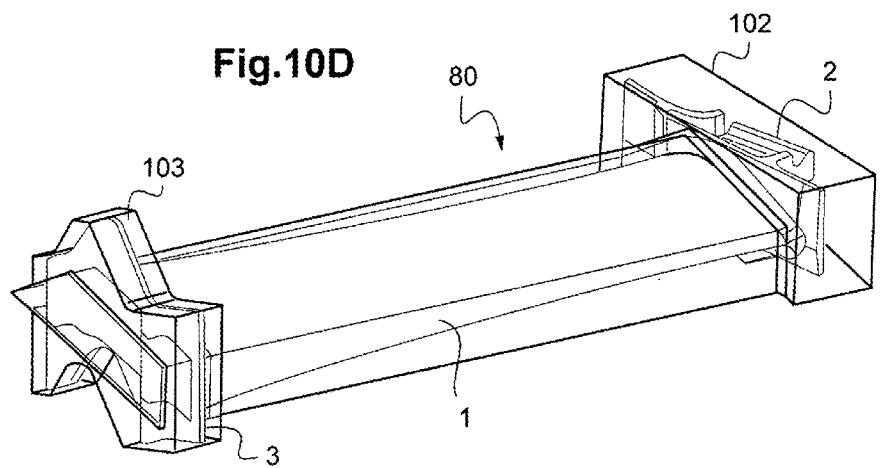
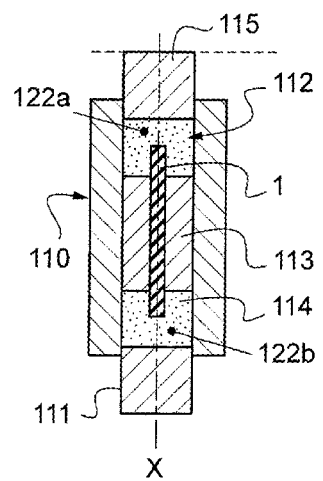
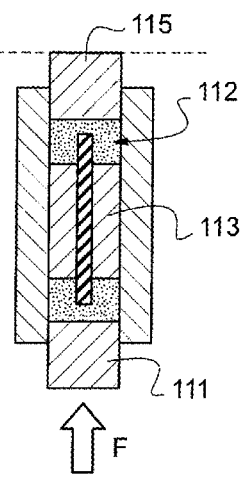
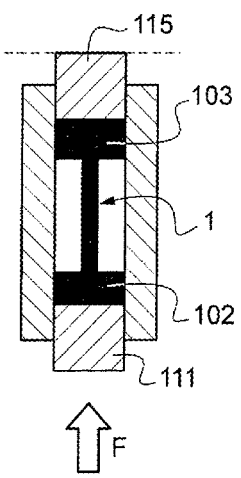

METHOD FOR PRODUCING METAL ALLOY PARTS WITH COMPLEX SHAPE

The present invention relates to a method for producing turbine engines solid blades.

It is advantageously implemented with metal materials that are difficult to transform into parts having a complex shape, like titanium aluminide.

It can also be implemented using ceramic-based materials.

It has a particularly important though nonexclusive use in the field of the solid blades or blades used in the aeronautical sector or the energy field, whether these blades or vanes are stationary or rotate.

For example, a turbine engine comprises at least one stationary nozzle guide blade assembly or stator, and a rotating blade assembly or rotor.

The stator is made up by stationary guide blades held between an inner ring and an outer ring or between two half-casings. In the case of a turbine, the stator makes it possible to guide and distribute the flow of the fluids over the blades of the rotor which are therefore rotated.

Conventionally, aeronautical blades are produced from either rough casting or as forged, partially or totally reworked.

It has already been proposed to produce stator stationary blades in several portions to facilitate operations particularly for piercing or machining before the assembly of the various portions (EP 3 103 580).

The distribution of the stresses present in a rotating blade is radically different to that observed in a stationary blade.

In particular, for blades all including a core, a root and a head, the stresses at the root (embedded for a stationary blade and a rotating blade), as far as over approximately half of the core, can have a ratio of 1 (stationary blade) to 100 (rotating blade). Indeed, if the thrust force is substantially the same in both cases, a rotating blade is subjected also to a centrifugal acceleration.

This is why this solution is limited to stationary blades. This is confirmed by the fact that the various portions are assembled by mechanical engagement.

The documents EP 2 772 614 and EP 1 481 755 which relate to hollow blades can also be mentioned.

The stresses linked to the centrifugal force are small in a hollow blade compared to those to which a solid blade is subjected.

This is the result of the respective positions of the center of gravity of the blade and of the respective masses of the blades.

It is for this reason that the teaching of these documents is limited to hollow blades.

When the rough piece is only partially machined and in particular when the profile of the blade is finished without mechanical reworking, a straightening, shaping and/or sizing operation is then essential to ensure functional dimensioning.

For small-sized turbine blades, in the case of forming a developmental prototype, or for perfecting operations, or for series blades made from easily machinable and inexpensive materials, ranges, said to be cut from the block, are used.

Such solutions have disadvantages in the case where it is desired to use titanium aluminide (gamma TiAl), which has good temperature resistance, but a significant brittleness at room temperature.

More specifically, these known solutions pose the following problems in particular.

In the case of a range obtained from a forged rough bar, using the entire surface for mechanical machining is possible but requires a complex machining range to be able to follow the deformations linked to the stress relaxations, or to use a self-adapting range. In addition, using a forged blank requires at least three process families: material development, forging, and machining, with a relatively long production cycle.

In the case of a range obtained with a rough casting, using the entire surface for mechanical machining is certainly possible but requires, again in this case, a complex machining range to be able to follow the deformations linked to the stress relaxations, said method generating, in any case, a significant scrap rate linked to the casting defects resulting after machining.

Using a rough casting finally requires three to five process families: material development, casting, possibly hot isostatic pressing, possibly straightening, and finally machining, and in this case again with a relatively long production cycle.

In the case of a range said to be cut from the block for mechanical machining, it is a matter in this case of starting from a slug (made by casting or extrusion) and transforming this simple geometry into that of the part by removing the surplus of material by machining.

Given the difficulty in machining gamma TiAl (again quite low cutting conditions, considerable tool wear, fragility of the material at room temperature, etc.) and the high cost of the material, this approach here again presents serious disadvantages for the production of blades in series.

It has been proposed to overcome these disadvantages using the method of producing turbine blades made from metal alloy described in FR2997885.

This method relates to simultaneously producing, from an aluminum and titanium alloy bar having a simple and/or axisymmetric geometry, at least two mutually interlocked blanks by waterjet cutting in the bar, then each of said resulting blanks is machined separately in order to obtain the blades having a final profile.

This method has the advantage of making several parts from the same bar and thus of limiting the amount of material lost when producing the blanks.

It also makes it possible to recover a material of good quality and, all else being equal, in greater quantity for recycling it. It should be noted here that only the feedheads are recoverable via the casting approach, the gates being cropped.

The applicant has continued the research thereof to try to further reduce the amount of material to be recycled, after obtaining the blade blanks, as well as the cost of these blanks.

For this purpose, the invention notably proposes a method for obtaining a turbine engine solid blade comprising a core, a head and a root, said method comprising:
  a step of producing a blank from at least two parts, at least one of them being a solid part, said at least two parts being assembled by a diffusion connection technique without melting and,
  a step of machining this blank in order to produce a blade with a defined profile.

It should be noted that "solid part" means a part that is not in powder form at the time of assembly.

Furthermore, in the context of the present invention, a machining step is understood to be an operation of removing at least 25% of material mass relative to the mass of the finished part.

Thus, this method is based on a design for obtaining a blade that is radically different to that used in the production methods currently implemented for solid and rotary blades.

Indeed, all these methods make it possible to produce blade blanks from a single part, whereas the method according to the invention consists in producing the blade from at least two assembled parts.

This approach is not the approach of a person skilled in the art since increasing the number of operations before obtaining the blank of a blade seems a priori more complicated than producing this blank in one go.

In addition, assembly is often associated to risks of embrittlement and therefore of deterioration in quality, which rules out the use of assembly for rotating blades subjected to substantial loads, particularly at the root thereof which is fixed on a hub or a disc and at the central portion of the core thereof which must be able to withstand impact.

In the context of the invention, the assembly used is not mechanical assembly including a step of engaging two adjacent parts one in the other, nor bonding assembly.

It is assembly by diffusion, i.e. assembly provided mainly by the diffusion of chemical elements between the two assembled parts, and without melting.

Thus, assembly by diffusion is achieved by means of processes that take place in a solid medium, either entirely (diffusion welding), or by combining a liquid phase (diffusion brazing with disappearance of the liquid phase at the end of the brazing stage).

In linear friction methods, spark plasma sintering methods and similar methods, solid state diffusion is not the only operating mechanism since viscoplasticity occurs in a very localized manner at the interface.

It has been found that assembly of this type does not cause degradation of the mechanical characteristics of the blade, which makes it possible to use this method for both stationary and rotating blades.

In practice, the production of each constituent part of the blade is simplified since it is possible to choose the most appropriate method for each of them.

It is also possible to choose the method that generates the least material loss.

Furthermore, each constituent part can be obtained from a bar made of a metal alloy but also from waste recovered from other productions, notably waste from a waterjet cutting method. This will then be a solid part in accordance with the invention.

Such a solid part can also be made of ceramic-based material and, for example, be made up of a ceramic-impregnated ceramic fiber matrix.

The method according to the invention ultimately makes it possible to simplify the production, to limit the quantity of materials used as well as the quantity of materials to be recycled, without affecting the robustness of the obtained part.

In advantageous embodiments, one and/or the other of the following arrangements are furthermore and/or additionally used:
at least two of said parts are solid;
at least one of said parts is obtained using powder, being formed directly on said at least one solid part;
at least one solid part is a block made of a metal alloy;
the core of said blade is obtained from a block cut at the periphery of a cylindrical rough piece with a solid section, to take advantage of the radius of curvature thereof in producing the outer surface of said core;
the core of said blade is obtained from a block cut in a cylindrical rough piece with an annular section, to take advantage of the radius of curvature thereof in producing the outer surface and/or the inner surface of said core;
at least one solid part is ceramic-based, in particular made of a ceramic matrix composite;
the powder is a metal alloy powder or a ceramic powder;
the metal alloy is titanium aluminide (gamma TiAl);
said at least two parts are assembled using a linear friction welding method;
said at least two parts are assembled using a method of diffusion welding under pressure;
at least one solid part is machined prior to the assembly thereof.

The invention also relates to a solid blade made of titanium aluminide and/or of a ceramic-based material, which solid blade is obtained by the method according to the invention.

The invention also relates to a turbine engine comprising at least one such blade.

The invention will be better understood and other aims, advantages and features thereof will appear more clearly on reading the description which follows and which is given with reference to the appended drawings wherein:

FIG. 1 is a perspective view depicting a turbine engine blade obtained by a method according to the invention.

FIGS. 2A and 2B are perspective views illustrating a cylindrical rough piece with an annular section before and after obtaining a plurality of blocks intended for producing turbine engine blade cores, each block being suitable for forming a solid part of the blank produced according to the first step of an embodiment of the invention.

FIGS. 4A and 4B illustrate an example of distribution of blocks intended for producing cores and ends of turbine engine blades in a cylindrical rough piece with a solid section, FIG. 4A being a top view of the rough piece and FIG. 4B an exploded view corresponding to FIG. 4A.

FIGS. 5A and 5B are perspective views illustrating another rough piece example (in this case with a hexagonal section and obtained from that illustrated in FIGS. 4A and 4B) making it possible to obtain blocks intended for producing turbine engine blade ends and suitable for forming solid parts that can be used with the invention, FIG. 5B being an exploded view of FIG. 5A.

FIG. 6A is a perspective view illustrating a cylindrical rough piece with a solid section making it possible to obtain blocks each intended for producing a core and a root of a turbine engine blade, and forming a solid part that can be used according to the invention.

FIG. 6B is a perspective view of a cylindrical rough piece with a solid section making it possible to obtain blocks each intended for producing a core, a root, or the head of a blade and forming a solid part that can be used according to the invention.

FIGS. 8A-8B are views similar to FIGS. 7A-7B according to another embodiment of the invention, the assembly being of the end-to-face type.

FIGS. 9A and 9B are sectional views similar to FIGS. 7B and 8B illustrating two modes of assembling a blade blank obtained according to two other embodiments of the invention, from two solid parts.

FIGS. 10A-10D are perspective views showing blades obtained according to another embodiment of the invention, comprising a head and/or a root, respectively, which are produced using powder on a solid core.

Figures 2C, 2D:
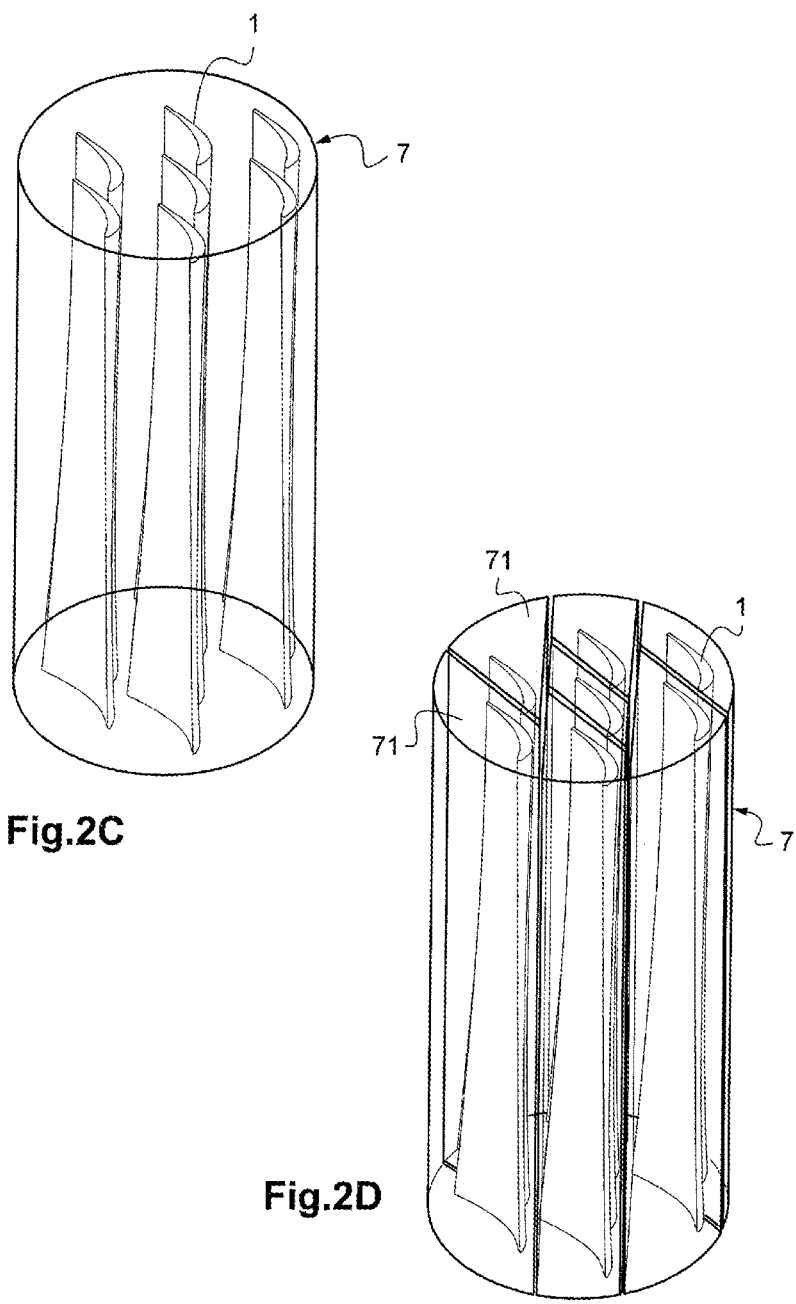
FIGS. 2C and 2D are perspective views illustrating a cylindrical rough piece with a solid section before and after obtaining a plurality of blocks intended for producing turbine engine blade cores, suitable for forming solid parts for a blank according to another embodiment of the invention.

FIGS. 11A to 11C schematically depict three steps of a powder densification method that can be used to rigidly connect the parts together in an embodiment of the invention.

The elements common to the various figures will be designated by the same references.

Referring firstly to FIG. 1, a turbine engine blade conventionally comprises three separate zones: the blade or core 1 that is central and, at each end thereof, the root 2 which allows the blade to be fixed on the drive shaft and the head 3.

In a known manner, the core has a crescent moon-shaped section, the root 2 has a generally parallelepiped shape and the head 3 is generally U-shaped.

This figure shows that the three constituent portions of a turbine engine blade have very distinct shapes.

The method according to the invention proposes taking advantage of these differences in shape to minimize the proportion of the material necessary for the production of the blade which is lost or which must be recycled.

Therefore, the method according to the invention proposes separating the blade into at least two parts. In the examples described with reference to FIGS. 2A-2D, 3A-3B, 4A-4B and 5A-5B, the blade is separated into three parts, this separation being produced at each major change of section. In practice, this amounts to separating the core, the root and the head.

The invention is, however, not limited to this use and the blade could be, for example, separated into two parts, each of them corresponding to different stress zones, as will be described with reference to FIGS. 6A-6B.

Reference is firstly made to FIGS. 2A-2D and 3A-3B which show examples of obtaining blocks intended for core, root and head formation for turbine engine blades.

In practice, as will be explained in the following description, a block designed for a part can be used to produce a portion of another part. However, to simplify the explanations, the terminology core, root and head used to designate the portions of a blade that are obtained from a block of material will be retained.

Thus, FIG. 2A illustrates a cylindrical rough piece with an annular section 4. It can particularly be a ring obtained by a centrifugal casting technique or by extrusion. In this rough piece 4, eight cores are depicted in thin lines to display the spatial requirement thereof and the positioning thereof inside the rough piece 4.

It is therefore understood that the height of the rough piece 4 is substantially equal to the length of the cores to be obtained. As will be explained in the following description, this depends on the type of link with the ends of the blade and on the nature of these ends (solid or powder-based).

FIG. 2A is intended to show how the material of the rough piece 4 can be used optimally to obtain these eight cores.

Thus, FIG. 2A shows that it is envisaged to position the cores 1, so that the concavity thereof is substantially oriented toward the central axis X of the block 4. In other words, the concavities of the ring 4 and of each core are oriented substantially in the same direction.

Thus, the outer surface 10 of a core 1 is located on the outer periphery 40 side of the rough piece 4, while the inner surface 11 thereof is oriented on the internal periphery 41 side of the rough piece 4.

FIG. 2A shows that, in this example, the cores are arranged substantially tip-to-tail to make the best use of the material of the block 4, since the section of the core is wider on one side than the other.

FIG. 2B shows the rough piece 4, once cut between each of the depictions of the cores 1, along the height thereof.

Cutting is carried out by waterjet as the cutting planes are not axial.

Thus, eight blocks 42 are obtained and, in each of them, a core 1 can be machined.

It should be noted that the invention is not limited to the use of a cylindrical rough piece with an annular section but can also be based on a conical rough piece with an annular section. Such a rough piece may be chosen to make cores, the section of which is wider on one side than the other. In both cases, the rough piece can also be cut along axial planes.

In general, it is known that, in a metal rough piece, porosities can exist at the center thereof. It is thus necessary to carry out post-treatments to be certain that a metal rough piece has suitable qualities, throughout the entire thickness thereof.

However, these post-treatments are very expensive.

It is therefore understood that a rough piece with an annular section, such as the rough piece 4, can be used without the need for post-treatments, the peripheral portion of a rough piece being always of better quality than the central portion thereof. In practice, defects may be present but they are often acceptable.

FIG. 2C illustrates a cylindrical rough piece with a solid section 7 in which seven cores are illustrated in thin lines to show the spatial requirement thereof and the positioning thereof.

As for the rough piece 4, the height of the rough piece 7 is substantially equal to the length of the cores 1 to be obtained.

Post-treatments have been necessary to ensure the same quality through the entire thickness thereof. It consists of hot isostatic pressing in particular to close the solidification defects for the rough pieces produced by casting. This pressing is not necessary for a rough piece obtained by extrusion. Moreover, heat treatment is, in any case, often necessary to obtain the minimum properties required for use.

FIG. 2D illustrates the rough piece 7 once cut between the depiction of the blades, according to two series of planes parallel to the central axis thereof, the planes of the two series forming, between them, a non-zero angle, so as to define, in this example, seven blocks 71 in which the positioning and the spatial requirement of each blade are illustrated in thin lines.

Figure 3A:
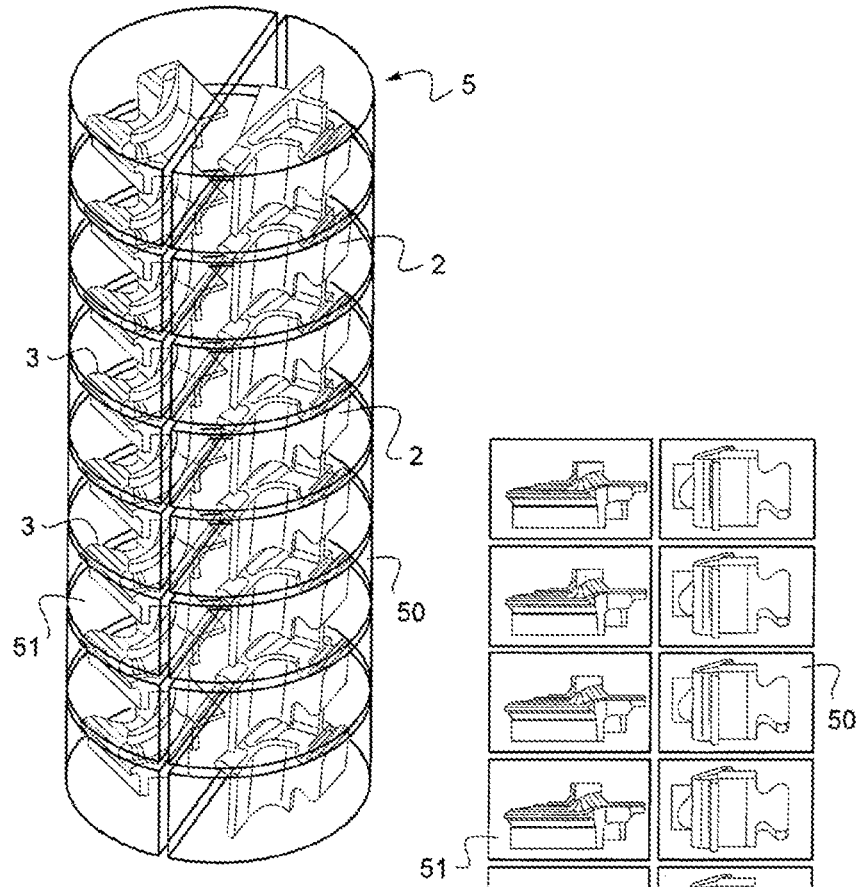
FIGS. 3A and 3B illustrate, in perspective and as a side view, a cylindrical rough piece cut into blocks intended for producing turbine engine blade ends, suitable for forming solid parts for a blank according to another embodiment of the invention.
Figure 3B:
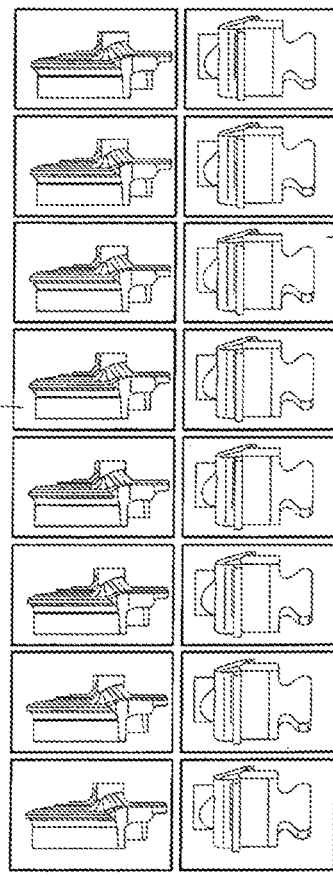

Reference is now made to FIGS. 3A and 3B.

FIG. 3A illustrates, in perspective, a solid cylindrical rough piece 5 in which eight roots 2 and eight heads 3 are illustrated in thin lines, so as to establish the spatial requirement thereof and the positioning thereof inside the rough piece 5.

This rough piece 5 and the rough piece 4 or the rough piece 7 are typically obtained from different slugs and the material thereof is not necessarily identical. Given the thickness thereof, the rough piece 5 has had to undergo appropriate post-treatments to provide a same quality through the thickness thereof. Moreover, the diameter thereof may be less than the inner diameter of the rough piece 4 and the height thereof less than that of the rough piece 4 or of the rough piece 7 since the two rough pieces are made independently. Thus, the rough piece 5 may, for example, be obtained by extrusion so that the dimensions thereof are defined as tightly as possible, to minimize the amount of material used.

To minimize the spatial requirement thereof, the roots 2 just like the heads 3 are arranged flat on each other.

FIG. 3A shows that the rough piece 5 is cut along a mid-plane containing the central axis X thereof, as well as along several planes perpendicular to this central axis in order to separate eight blocks 50 and eight blocks 51, which are intended for the formation of a root 2 or a head 3, respectively.

These various blocks 50 and 51 are also illustrated in FIG. 3B which is a side view of FIG. 3A.

This cutting is produced in this case with a saw. With waterjet cutting, the blocks could have a shape closer to the root or the head of the final blade, as is illustrated, for example, in FIG. 7A.

Reference is now made to FIGS. 4A-4B and 5A-5B to describe other steps for obtaining a plurality of turbine engine blade cores, roots and heads, from a same cylindrical rough piece.

Such a rough piece or bar 6 is illustrated as a top view in FIG. 4A.

This figure also illustrates, in thin lines, the location and the spatial requirement of six cores 1, positioned at the periphery of the rough piece 6 and of a root 2 and of a head 3 which are positioned in the central portion of the rough piece 6.

It is understood that the cores 1 extend over the entire height of the rough piece 6, the height of which is therefore substantially equal to the length of the cores. As previously described with regard to FIG. 2A, the concavities of the rough piece 6 and of each core 1 are substantially oriented in the same direction. Thus, the outer surface 10 of each core 1 is oriented toward the outer periphery 60 of the rough piece 6, while the inner surface 11 of each core 1 is substantially oriented toward the central axis X of the bar.

Of course, in the center of the rough piece 6, it is possible to provide for the spatial requirement of a plurality of roots 2 and heads 3, in practice six in the present case, which are stacked according to the height of the rough piece 6.

FIG. 4B illustrates the cut of the rough piece 6, which cut makes it possible to set apart six blocks 61 in each of which a core 1 can be made. These blocks in this case are cut along planes parallel to the axis X to allow either waterjet cutting or saw blade cutting. The blocks 62 separated between two blocks 61 represent waste.

Cutting the blocks 61 and 62 makes it possible to separate a central rough piece 63 which extends over the entire height of the rough piece 6 and to obtain blocks 61 which are all substantially identical.

The blocks 61 are made in the peripheral portion of the cylindrical block 6 which is of better quality than the central rough piece 63 and which, in practice, often does not require any post-treatment.

It is noted that the section of the rough piece 63 is a hexagon. Indeed, it is relatively easy to cut a block according to the height thereof, with a blade saw, forming cut faces. This is not the case if the aim is to obtain a rough piece with a cylindrical section.

FIG. 5A is a perspective view of the block 63, in which six roots 2 and six heads 3 are depicted in thin lines.

FIG. 5A shows that the heads 3 are provided flat, while the roots 2 are provided vertically.

It is understood that, if the height of the block 63 is necessarily substantially equal to the height of the cores 1, it is however possible to optimize the arrangement of the roots 2 and of the heads 3 in the rough piece 63 to reduce the diameter thereof and therefore the diameter of the rough piece 6.

FIG. 5B shows that the rough piece 63 is cut along a mid-plane containing the central axis X thereof, as well as along several planes perpendicular to this axis in order to obtain six blocks 64 intended for the formation of roots and six blocks 65 intended for the formation of heads.

Of course, the central rough piece 63 is used for the formation of roots and/or heads insofar as the quality of the material allows it, i.e. in practice if the rough piece 6 has undergone appropriate post-treatments. In this case, the six blade rough pieces are advantageously obtained from the same material batch.

In the opposite case, only the peripheral portion of the rough piece 6 is used for the formation of cores (as is illustrated in FIGS. 2A and 2B) and the block 63 is recycled.

The roots and the heads are then obtained from a rough piece that does not belong to the same material batch as the rough piece 6.

FIGS. 6A and 6B illustrate two variants of the method according to the invention, in which method a blade blank is obtained from two solid parts and not three, as previously described.

Thus, FIG. 6A illustrates a cylindrical rough piece 8 with a solid section, in which rough piece two parts 12 corresponding to a core 1 and a root 2 are illustrated in thin lines, to show the spatial requirement thereof and the positioning thereof.

The height of the rough piece 8 is at least equal to the length of the parts 12 that are intended to be obtained.

For best use of the material of the rough piece 8, the two parts 12 are arranged tip-to-tail.

FIG. 6A also illustrates how the rough piece 8 is cut into two blocks 80 and 81, each of them making it possible to machine a part 12.

FIG. 6A shows that the cutting plane is slightly twisted with respect to the longitudinal mid-plane of the rough piece 8, to obtain this result.

It is understood that a blade blank can then be obtained from the block 80, 81 and, for example, from a block 50, as illustrated in FIG. 3A.

As will be seen hereafter in the description, the head 3 can also be obtained from powder.

FIG. 6B illustrates a variant in which, from a cylindrical rough piece 9 with a solid section, similar to the block 8 but with a greater diameter, blocks for the formation of parts 12 and blocks intended for the formation of heads 3 of a core can both be obtained.

Thus, two parts 12 similar to those illustrated in FIG. 6A and also arranged tip-to-tail, and two heads 3 are depicted in thin lines inside the rough piece 9.

FIG. 6B shows that the two heads 3 are provided in the zone of the part 12 furthest from the root 2, for the part 12 opposite which it is provided.

FIG. 6B also illustrates how the rough piece 9 can be cut to obtain two blocks 90 and 91 from each of which can be machined a part 12, and two blocks 92 and 93, from each of which a head 3 can be machined.

This variant has the advantage of being able to produce blade blanks from the same material batch.

Reference will now be made to the other figures to illustrate how a blank of a turbine engine blade can be obtained from the blocks illustrated in FIGS. 2B, 3A-3B, 4B, 5B, 6A and 6B.

In general, two types of method can be distinguished: those in which a blank of the blade is obtained only from solid parts and those in which the blank includes at least one part obtained using powder.

Moreover, in both types of method, the blank of the blade can be obtained from two or three parts.

Thus, for the methods of the first type, the core, the root and the head of the blade are all obtained from the blocks illustrated in FIG. 2B, 3A-3B, 4B, 5B or 6B.

In the methods of the second type, it will be possible to use, for example, the blocks illustrated in FIGS. 2B and 4B intended to obtain a core, then to produce the head and the root of the blade by means of powder or to produce one of the ends using a block illustrated for example in FIGS. 3A-3B and 5B and the other end from powder, or produce the core and the root using the blocks illustrated in FIG. 6A and the head from powder.

Focus will turn next to the method of the first type, in which all the parts used for obtaining a blade blank are solid parts.

As shown in the previous figures, this core blank can, moreover, be obtained from two or three solid parts.

Focus will first turn to obtaining a blade blank from three solid parts.

The solid parts intended to obtain a core may thus consist of the blocks 42, 71 and 61 described with reference to FIGS. 2B, 2D and 4B.

Moreover, the solid parts intended to obtain roots or heads of the blade may consist of the blocks 50 and 51 illustrated in FIG. 3A or 3B or the blocks 64 and 65 illustrated in FIG. 5B.

When the block corresponding to a core is the type of the blocks 42 and 71 that are illustrated in FIGS. 2B and 2D, it is understood that the core, on the one hand, and the head and the root, on the other hand, of the final blade, are not obtained from the same slug of material.

As explained with reference to FIGS. 4A-4B and 5A-5B, all the solid parts intended to obtain the blank of a blade may, on the contrary, come from the same rough piece and therefore be made up of the same material.

The various modes of assembly of these solid parts will now be described with reference to FIGS. 7A-7B and 8A-8B.

In general, it can be envisaged to assemble blocks together, the obtained blank then being machined to obtain a blade.

It would also be possible to consider machining each block or at least some of them to obtain the part for which it is intended or a shape close thereto.

However, assembly at least partly by blocks is preferred since it makes it possible to limit the number of machining operations and, as will be shown, this offers more flexibility in the use of the solid parts in order to obtain the blade.

In the examples illustrated in FIGS. 7A-7B and 8A-8B, the core 1 has been machined beforehand, for example from one of the blocks 42, 71 or 61 illustrated in FIGS. 2B, 2D and 4B.

By contrast, the blocks intended for obtaining a head or a root have not yet been machined.

Figure 7A:
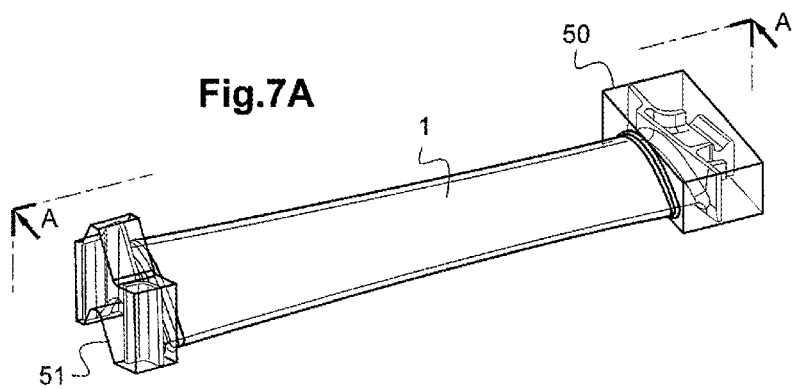
FIGS. 7A-7B depict a blade blank according to an embodiment of the invention, obtained from three solid parts, the assembly being carried out end-to-end, FIG. 7A being a perspective view and FIG. 7B being a sectional view along A-A.

In the example illustrated in FIG. 7A, the blocks 50 and 51 used are those depicted in FIG. 3A, which are then rough-machined.

It should also be noted that blocks having the geometry illustrated in FIG. 7A could be obtained by waterjet cutting.

Figure 7B:
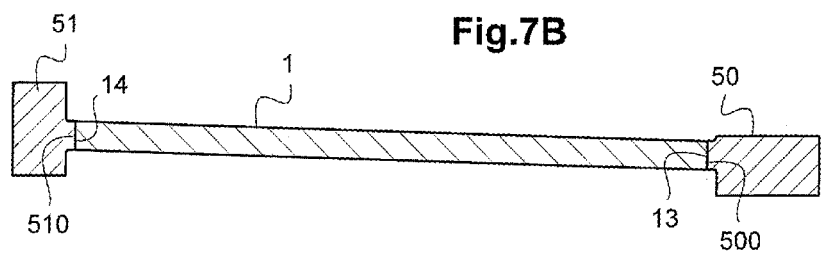

FIGS. 7A and 7B illustrate an assembly between the core 1 and the blocks 50 and 51 of the end-to-end type.

In this type of assembly, the faces 510 of the block 51 and 14 of the core 1 which are assembled together have the same surface. It is the same for the faces 500 of the block 50 and 13 of the core 1.

FIG. 7B shows that with this type of assembly, the blocks 50 and 51 intended for the formation of the root and the head contribute, in practice, also to the formation of the core 1 in the final blank.

In this case, the blocks from which the cores 1 are formed, for example the blocks 4, 7 or 6, may have a height less than the length of the cores.

FIGS. 8A and 8B show an end-to-face-type assembly.

In this type of assembly, the mutually assembled faces 510 of the block 51 and 12 of the core 1 do not have the same surfaces and it is the same for the faces 13 of the core 1 and 500 of the block 50.

In any case, assembly is carried out using a connection technique without melting.

This can in particular be a linear friction welding method, for example the LFW (Linear Friction Welding) method.

Since this LFW method generates an upset at the joint between two parts, it is necessary to provide excess lengths.

In this case, the blocks from which the cores 1 are formed may have a height greater than the length of the cores.

It is also possible to use a spark plasma sintering or SPS method which avoids any significant upset of material at the joint between two parts (unlike the LFW method).

Furthermore, assembly of the three parts is carried out simultaneously or successively, in particular according to the constraints of the assembly methods used.

In a variant, the core and the root can be made from a same block, such as the blocks 80, 81 illustrated in FIG. 6A or the blocks 90 and 91 illustrated in FIG. 6B.

In this case, a blade blank will be obtained from one of these blocks 80, 81 or 90, 91 and from another block corresponding to the head of the blade.

It may be a block 51, as illustrated in FIG. 3A or a block 93 as illustrated in FIG. 5B.

It is understood that, in the first case, the blank will comprise elements from different slugs of material. By contrast, if the blank is obtained from, for example, the blocks 90 and 92, the blank of the core will be made from a single material.

This assembly will not be described in greater detail. It can be of the end-to-end or end-to-face type, as illustrated in FIGS. 9A and 9B.

These two figures illustrate two solid parts, for example the block 90 and the block 93, the block 90 having been previously machined to obtain the core 1 of the final blade.

FIG. 9A shows an end-to-end-type assembly, the faces 930 and 900 of the blocks 93 and 90 having the same surface.

In a variant, FIG. 9B illustrates an end-to-face-type assembly, the assembled surfaces 930 and 900 of the blocks 93 and 90 having a different surface.

It is understood that this variant of the method makes it possible to obtain a blade which is produced as one unit in the zone which is subjected to the most stress.

In the modes of implementation illustrated in FIGS. 7A, 7B, 8A-8B and 9A-9B, the blocks have been rough-machined beforehand.

The invention is, however, not limited to this implementation example and one of these blocks could be directly used, or pre-machined to the final geometry thereof, leaving excess thicknesses at the interface zones.

Reference is now made to FIGS. 10A to 10D to describe a method example of the second type, in which at least one part involved in producing the blank of the blade is made from powder.

Figure 10A:
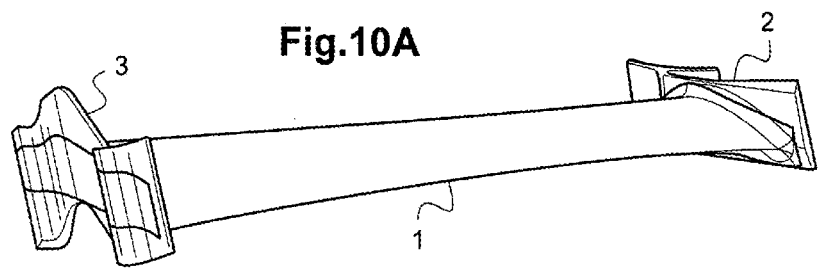
Figure 10B:
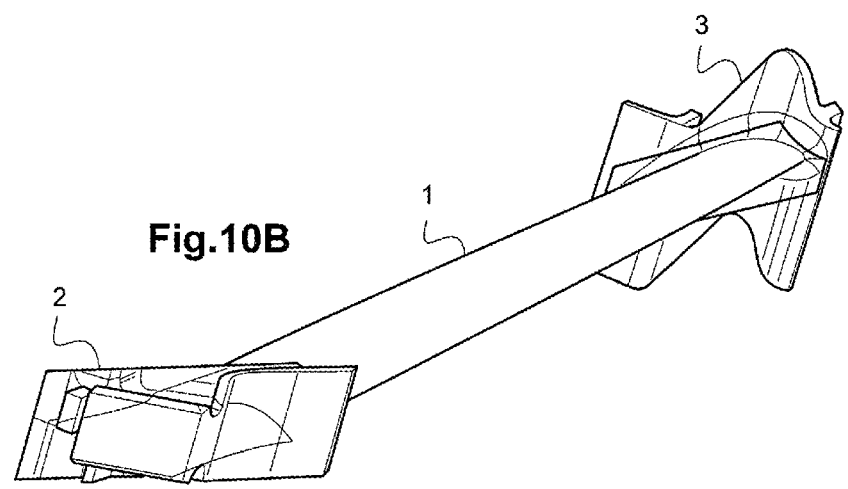

Reference is first made to FIGS. 10A and 10B which are two views of a same blade obtained from a core 1 produced from a solid part and a root 2 and a head 3 made from powder.

Thus, the core 1 can be obtained from one of the blocks 42, 71 or 61 described with reference to FIGS. 2B, 2D and 4B, but with a length greater than that of the core 1 in the final blade, the block being previously machined or not before the formation of the head and root.

Figure 10C:
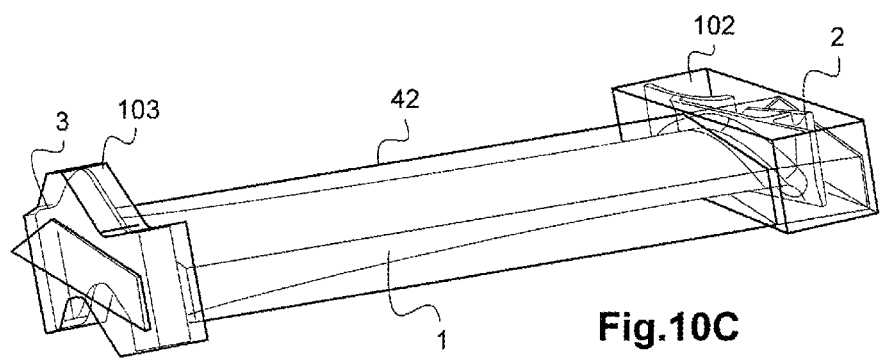

FIG. 10C thus illustrates a method of obtaining a blade blank from a solid part such as the block 42 illustrated in FIG. 2B and making it possible to obtain a core 1 (illustrated in thin lines in FIG. 10C) and two blocks 102 and 103 obtained from powder and allowing the formation of a root 2 and a head 3 (which are illustrated in thin lines in FIG. 10C inside the blocks 102 and 103).

Of course, the block for producing a core could also be the type of block 71 illustrated in FIG. 2D or block 61 illustrated in FIG. 4B, or other blocks obtained by different methods, in particular by foundry extrusion or powder sintering (spark plasma sintering, metal injection molding) and leading to a geometry that is closer to the quoted measurements, or even complete.

The blocks 102 and 103 are formed directly on the ends of the block 42 from powder densified by a technique of diffusion welding under pressure, such as the so-called SPS (spark plasma sintering) technique.

For this purpose, the cleanliness of the interface is checked beforehand and particularly that there is no abrasive grain (resulting from waterjet cutting) encrusted in the surface of the material.

This technique is described schematically with reference to FIGS. 11A to 11C.

It uses tooling comprising a first fixed portion 110 closed on one side by a second fixed portion 115 and on the other side by a third portion 111, these three portions defining a cavity 112, in which the second portion 111 is mounted such as to be translatable along the longitudinal axis X of the cavity 112.

Inside the cavity 112, a third part 113 is provided which is also movable along the longitudinal axis X. It is made in two half-shells to allow demolding. This part 113 is intended to hold a core 1 or a block, such as the block 42, in which a core can be made.

This part 113 delimits two sub-cavities 122a and 122b, into which powder 114 is introduced in appropriate quantities.

This powder may be a metal alloy powder such as TiAl, or a ceramic powder, such as silicon carbide (SiC).

FIG. 11B describes the next step of the method in which a pressure, represented by the arrow F, is applied to the second part 111, which translates inside the cavity 112, like the third part 113.

The application of this pressure makes it possible to pack the powder inside the cavities 122a and 122b, the volume of which has decreased between the step illustrated in FIG. 11A and the end of the step illustrated in FIG. 11B.

FIG. 11B shows that the linking interface between the core 1 and the block 103 is much greater than the section of the core. The latter would correspond to the linking interface in the case of an end-to-end assembly.

FIG. 11C illustrates a last step of the method in which a pressure force is still exerted on the second part 111, an electric current being moreover applied through the second portion 115, this current passing through the various parts present inside the cavity 112. This last step of the method makes it possible to densify the powder present in the cavities 112a and 112b and to obtain, in the example illustrated in FIG. 10A, the blocks 102 and 103 which are thus created simultaneously on the core 1 or on the block 42.

FIG. 10C shows that the method according to the invention makes it possible to obtain a parallelepiped-shaped block such as the block 102, or a block having a specific profile, such as the block 103, which profile is close to that of the head 3.

In this regard, it should be noted that, in the example illustrated in FIG. 10C, the block 42 completely passes through the blocks 102 and 103 obtained based on powder, this configuration therefore being different to that illustrated in FIGS. 11A to 11C.

In any case, the block 42 (or the core of the blade if the block is previously machined) is at least partly inserted into the blocks 102 and 103, with the result that the linking surface between the block 42 and the block 102 or the block 103, respectively, is larger than in the case of an end-to-end assembly.

In addition, the portion of the blade that endures the most stress, in this case the core, can be continuous over the entire blade, which reinforces the strength thereof.

Thus, preferably, the length of the core will be chosen to completely pass through the root (and thus be level with the outer surface of the root, on the final blade), the core/root linking zone being that which is most loaded in a rotating blade.

Of course, the invention is not limited to these two examples and the blocks could have another simple geometry such as a washer or a profile even closer to the end to be obtained.

FIGS. 10A and 10B illustrate a blade obtained from the blank illustrated in FIG. 10C.

These two figures are intended to show the interlock between the solid core and the head and the root which are obtained from powder.

Thus, these two figures show that the junction between the core and the ends is produced in the latter, and therefore outside the zones of greater stress of the blade. This helps to reinforce the mechanical strength of the obtained blade.

Furthermore, if the powder has a higher production cost than a raw material, it is understood that the method which has just been described makes it possible to produce end parts, the quoted measurements of which are very close to the head or to the root of the final blade. Thus, this method makes it possible to reduce the steps for machining the blank, and the material used.

FIG. 10D illustrates a variant of the method, which variant is illustrated in FIG. 10C, in which the blank of the blade is obtained from a solid part, such as the block 80 illustrated in FIG. 6A and in which can be obtained, in a single part, a core 1 and a root 3 (which are illustrated in thin lines in FIG. 10D) and from a block 103 obtained from powder and in which the head 3 of the final core (also illustrated in thin lines) can be produced.

Thus, the obtained blade will have, on the head 3 side, interlocking between the solid core and the head 3 as illustrated in FIG. 10A.

As illustrated in FIGS. 10A and 10B, FIG. 10D confirms that the block 103 is produced directly on the block 80.

FIGS. 10A to 10D show that the provision of powder makes it possible to produce, at one end of the core at least, a part which has a geometry different to that of the core and in particular a very different section. In other words, there is a major section difference between the core and the root (or the head) formed thereon thanks to the provision of powder.

Moreover, the provision of powder is used to produce a functional zone of the part which is subjected to high stresses.

This is particularly the case for the root of a rotor blade, which root is connected to the inner disc of the rotor.

Moreover, in the case of a stator blade, the root and the head of the blade are the two zones of the blade subjected to the greatest stresses.

Finally, the mass of material provided initially (before machining) with the powder can correspond to the total mass of the final blade. Moreover, after machining, the mass of material provided with the powder represents a substantial proportion of the mass of the final blade (for example approximately 10%).

Another variant (not shown in the figures) of the method consists in producing a blank of the blade from two solid parts and from a part obtained from powder.

By way of example, this blank can be obtained from a block 42, 71 or 61, as illustrated in FIG. 2B, 2D or 4B, from another solid part intended for the formation of the root 2 of the blade such as the block 51 illustrated in FIG. 3A, and a part obtained from powder and intended for the formation of the head 3 of the blade. The latter case corresponds, in practice, to a variant of the method illustrated in FIGS. 7A-7B and 8A-8B.

All the examples described confirm that the method according to the invention makes it possible to minimize the material used and the material waste, the separation of the blade into two or three portions offering more flexibility in using the material.

To illustrate the savings in material that can be achieved with the method according to the invention, indicated in the table above is the total mass (g) of material used to obtain a blade (mass/blade) in various scenarios.

The reference (with value 100) corresponds to a blade obtained using the method described in the document FR 2 997 885.

| Method | Mass/blade (g) | Saving vs FR 2 997 885 |
| --- | --- | --- |
| FR 2 997 885 | 100 | |
| FIGS. 6A-6B 9A-9B | 88 | 12% |
| FIGS. 4A-4B, 5A-5B, 7A-7B, 8A-8B | 69 | 31% |
| FIGS. 10A-10C | 40 | 60% |

Furthermore, once the blank of the blade has been obtained, machining is carried out to remove the excess thicknesses and obtain the blade with the final dimensions thereof, such as the blade illustrated in FIGS. 1, 10A and 10B.

Two tensile tests at room temperature were carried out on various types of test pieces to show the consequences of an assembly carried out using a connection technique without melting on a part.

These tensile tests at room temperature were carried out according to the French standard NF EN ISO 6892-1.

The typical values of ultimate tensile strength (Rm), and of yield stress (Rp02) are given in the two tables below.

The minimum values required are conventionally given by the manufacturer and correspond to a sizing of the blade that allows it to withstand the stresses to which it is subjected.

Thus, in a first test, several test pieces were made:
test piece 1: obtained by casting and solid
test piece 2: obtained by assembling two solid parts, using the SPS technique
test piece 3: obtained by assembling a solid part and a part formed by powder.

TABLE 1

| | Test piece | | | |
| --- | --- | --- | --- | --- |
| Values | 1 (solid) | 2 (assembly of 2 solid parts) | 3 (assembly of solid/powder) | Min. values for function |
| RM (MPa) | 453 | 428 | 448 | 425 |
| Rp0.2 (MPa) | 382 | 361 | 376 | 360 |

Table 1 confirms that the techniques for assembly without melting make it possible to obtain parts, the mechanical characteristics of which are comparable to or greater than those required for the function.

In a second test, several test pieces were made:
test piece A: obtained by casting and solid
test piece B: obtained by powder consolidated by the SPS technique
test piece C: obtained by assembling a solid part and powder consolidated by the SPS technique.

TABLE 2

| | Test piece | | | |
| --- | --- | --- | --- | --- |
| Values | A (solid) | B (powder) | C (assembly of solid part/powder) | Min. values for function |
| RM (MPa) | 447 | 487 | 503 | 425 |
| Rp0.2 (MPa) | 441 | 419 | 463 | 360 |

Table 2 surprisingly shows that the techniques without melting of the SPS type that are used with powder even make it possible to obtain parts, the mechanical characteristics of which are greater than those required for the function and those corresponding to a solid part.

In general, the designer of the blades will choose the most suitable production method according to the stresses to which they are subjected.

As is obvious and as also follows on from the above, the present invention is not limited to the embodiments more specifically described. On the contrary, it covers all the variants thereof and in particular those in which a solid part, for example the core, is based on ceramics and not on metal, in particular a ceramic matrix composite composed of ceramic fibers woven and impregnated with ceramics, such as silicon carbide (SiC), the ends being made from ceramic or metal powder for example.

The invention claimed is:

1. A method for obtaining a turbine engine solid blade having three constituent portions that comprise a core (1), a head (3) and a root (2), the core having two ends, the root being joined to one end of the core and the head being joined to the other end of the core, said constituent portions having distinct shapes, said blade being intended to be part of a set of blades, said method comprising:
    a first step comprising one of:
        obtaining at least one solid part made of ceramic-based material, or
        cutting the at least one solid part from a bar made of a metal alloy;
    a second step of producing a blade blank from at least two blank parts (42, 61, 71, 50, 51, 64, 65, 80, 81, 90, 91, 92, 93), at least one of the blank parts being a solid part obtained in the said first step, said at least two blank parts being assembled by a diffusion connection technique without melting, said technique being a Spark Plasma Sintering technique, and,
    a third step of machining this blade blank to produce a final blade with a defined profile, the root of the final blade being configured for fixing on a turbine hub or a turbine disk and the head of the final blade having a shape configured to contact heads of adjacent blades of the said set of blades.

2. The method as claimed in claim 1, wherein said at least two blank parts are solid.

3. The method as claimed in claim 1, wherein at least one of said at least two blank parts (103, 104) is obtained using powder, being formed directly on said at least one solid part.

4. The method as claimed in claim 1, wherein the first step comprises cutting the at least one solid part from the bar made of the metal alloy and said at least one solid part is a block made of the metal alloy.

5. The method as claimed in claim 4, wherein the core (1) of said blade is obtained from a block (61) cut at the periphery of a cylindrical rough piece (6) with a solid section, to take advantage of the radius of curvature thereof in producing the outer surface of said core.

6. The method as claimed in claim 4, wherein the core (1) of said blade is obtained from a block (42) cut in a cylindrical rough piece (4) with an annular section, to take advantage of the radius of curvature thereof in producing the outer surface and/or the inner surface of said core.

7. The method as claimed in claim 1, wherein the first step comprises obtaining the at least one solid part made of the ceramic-based material and the at least one solid part is ceramic-based.

8. The method as claimed in claim 3, wherein the powder is a metal alloy powder or a ceramic powder.

9. The method as claimed in claim 4, wherein the metal alloy is titanium aluminide.

10. The method as claimed in claim 1, wherein said at least one solid part is machined prior to the assembly thereof.

11. The method as claimed in claim 1 wherein the first step comprises obtaining the at least one solid part made of the ceramic-based material and the at least one solid part is made of a ceramic matrix composite.

12. The method as claimed in claim 4, wherein the metal alloy is gamma TiAl.

* * * * *